United States Patent
Peterson et al.

(10) Patent No.: US 11,048,462 B1
(45) Date of Patent: Jun. 29, 2021

(54) ASSOCIATING A SELECTOR WITH PLURAL APPLICATIONS FOR PRESENTING THE PLURAL APPLICATIONS ON RESPECTIVE PLURAL MONITORS

(71) Applicant: Lenovo (Singapore) Pte. Ltd., Singapore (SG)

(72) Inventors: Nathan J. Peterson, Oxford, NC (US); Arnold S. Weksler, Raleigh, NC (US); Russell Speight VanBlon, Raleigh, NC (US); John Carl Mese, Cary, NC (US); Mark Patrick Delaney, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/790,733

(22) Filed: Feb. 14, 2020

(51) Int. Cl.
  *G06F 3/0482* (2013.01)
  *G06N 3/08* (2006.01)
  *G06F 3/14* (2006.01)
  *G06F 3/0488* (2013.01)

(52) U.S. Cl.
  CPC .......... *G06F 3/1454* (2013.01); *G06F 3/0482* (2013.01); *G06F 3/04883* (2013.01); *G06F 3/1438* (2013.01); *G06N 3/08* (2013.01)

(58) Field of Classification Search
  CPC .. G06F 3/1454; G06F 3/0482; G06F 3/04883; G06F 3/1438; G06N 3/08
  USPC ........................................................ 715/761
  See application file for complete search history.

(56) References Cited

U.S. PATENT DOCUMENTS

| | | |
|---|---|---|
| 5,564,002 A | 10/1996 | Brown |
| 5,796,403 A | 8/1998 | Adams et al. |
| 7,882,448 B2 | 2/2011 | Haug |
| 2001/0035882 A1 | 11/2001 | Stoakley et al. |
| 2002/0123916 A1 | 9/2002 | Godin et al. |
| 2009/0055413 A1 | 2/2009 | Audet |
| 2010/0023506 A1 | 1/2010 | Sahni et al. |
| 2010/0180200 A1 | 7/2010 | Donneau-Golencer et al. |
| 2011/0138295 A1* | 6/2011 | Momchilov .......... G06F 3/0484 715/740 |
| 2012/0096392 A1 | 4/2012 | Ording et al. |
| 2012/0227007 A1* | 9/2012 | Nicholson .............. G06Q 10/10 715/779 |

(Continued)

OTHER PUBLICATIONS

Nicholson et al., "Automatic Taskbar Grouping by User Tasks", file history of related U.S. Appl. No. 13/039,365, filed Mar. 3, 2011 now U.S. Pat. No. 10,242,341 issued Mar. 26, 2019.

*Primary Examiner* — Tadesse Hailu
*Assistant Examiner* — Darrin Hope
(74) *Attorney, Agent, or Firm* — John M. Rogitz; John L. Rogitz

(57) ABSTRACT

In one aspect, a device includes a processor, first and second video displays accessible to the processor, and storage accessible to the processor and including instructions executable by the processor to present on a task bar of at least one of the video displays at least a first selector selectable to cause a first application to be presented on the first video display and a second application to be presented on the second video display, and to present on the task bar at least a second selector selectable to cause a third application to be presented on the first video display and a fourth application to be presented on the second video display.

20 Claims, 5 Drawing Sheets

(56) References Cited

U.S. PATENT DOCUMENTS

2016/0085417 A1* 3/2016 Stauber ................ G06F 3/0482
715/788

* cited by examiner

US 11,048,462 B1

ASSOCIATING A SELECTOR WITH PLURAL APPLICATIONS FOR PRESENTING THE PLURAL APPLICATIONS ON RESPECTIVE PLURAL MONITORS

FIELD

The present application relates to technically inventive, non-routine solutions that are necessarily rooted in computer technology and that produce concrete technical improvements.

BACKGROUND

As recognized herein, no convenient way exists to have groups of related applications that may be used in cooperation to accomplish a single task tied together using a single "desktop". If a user has different types of tasks being worked on, each task may entail the use of multiple applications, but once exited there is no way to repopulate all the screens for one of these tasks with a single click. Multiple desktop instantiations may be used but this is inconvenient for various reasons. The only remedy for the user to repopulate multiple screens with related applications to re-engage a task is to click on each application icon in a task bar individually.

There are currently no adequate solutions to the foregoing computer-related, technological problem.

SUMMARY

Accordingly, in one aspect a device includes at least one processor, first and second video displays accessible to the at least one processor, and storage accessible to the with instructions executable by the processor to present on a task bar of at least one of the video displays at least a first selector selectable to cause a first application to be presented on the first video display and a second application to be presented on the second video display. The instructions also are executable to present on the task bar at least a second selector selectable to cause a third application to be presented on the first video display and a fourth application to be presented on the second video display.

In some embodiments the first selector is selectable to cause a fifth application to be presented on a third display.

In example implementations, each selector may be configured as stacked overlapping boxes with each box representing a respective application.

In non-limiting examples the instructions can be executable to, responsive to selection of the second selector with the first and second applications presented in foregrounds of the respective first and second video displays, replace the first and second applications with the third and fourth applications in the foregrounds of the first and second video displays.

In some implementations, the number of applications invoked by selection of the first selector is on a one-to-one basis with the number of video displays of the device. In other implementations, the number of applications invoked by selection of the first selector is greater than a number of video displays of the device, and selection of the first selector causes the first application to be presented on the first video display, the second application to be presented in a first window on the second video display, and a fifth application to be presented in a second window of the second video display.

The first and second applications may be associated with the first selector responsive to input from a user input device associating the first and second applications with the first selector. Or, the first and second applications may be associated with the first selector using at least one neural network.

In another aspect, a method includes associating a first selector with plural applications, and responsive to selection of the first selector, presenting the plural applications on respective plural monitors.

In another aspect, a computer readable storage medium that is not a transitory signal includes instructions executable by at least one processor to identify that at least first and second applications are associated with a first selector, and responsive to a single selection of the first selector, establish in foregrounds of respective video displays the respective first and second applications.

The details of present principles, both as to their structure and operation, can best be understood in reference to the accompanying drawings, in which like reference numerals refer to like parts, and in which:

DETAILED DESCRIPTION

Figure 1:
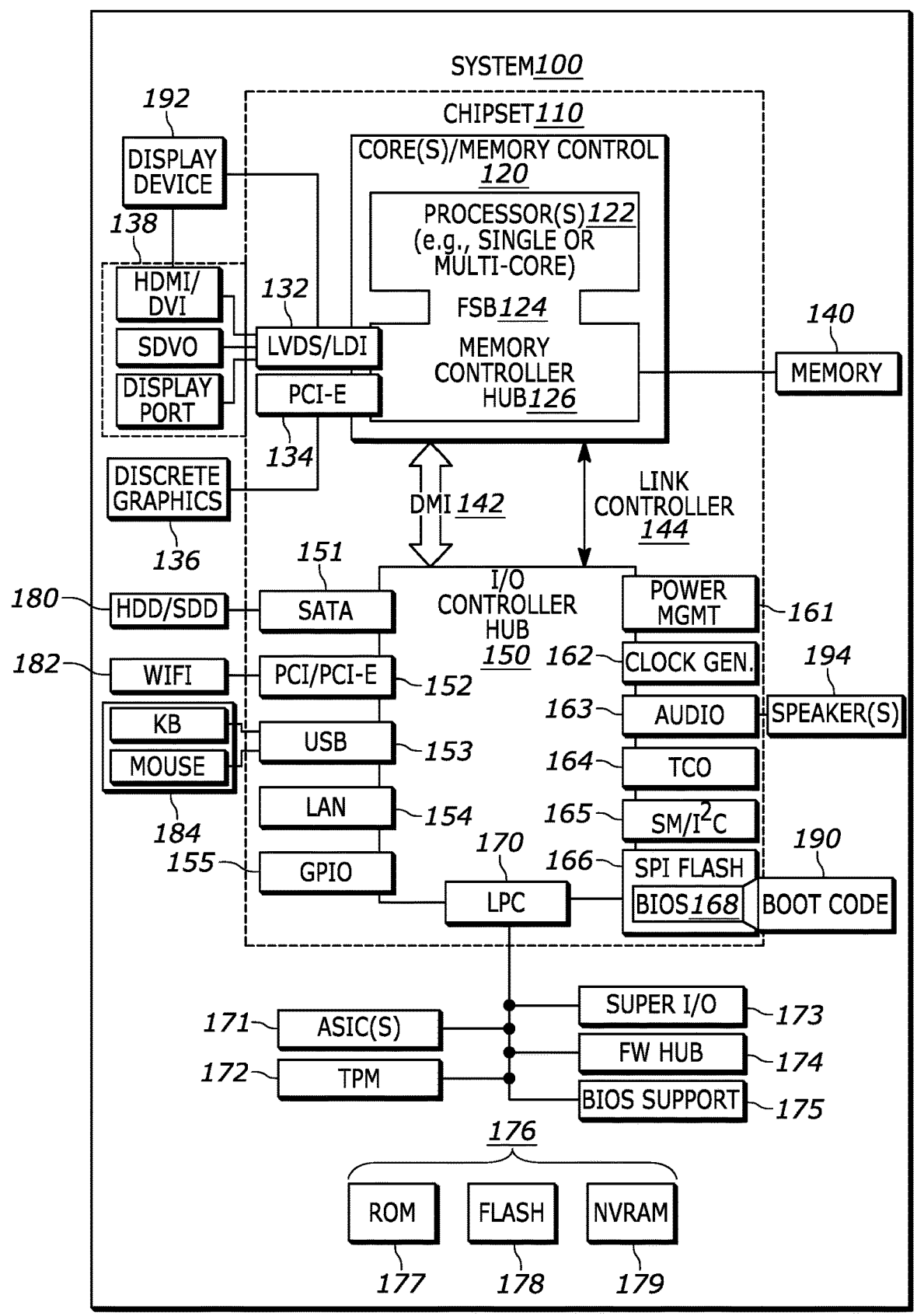
FIG. 1 is a block diagram of an example system consistent with present principles.

Note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
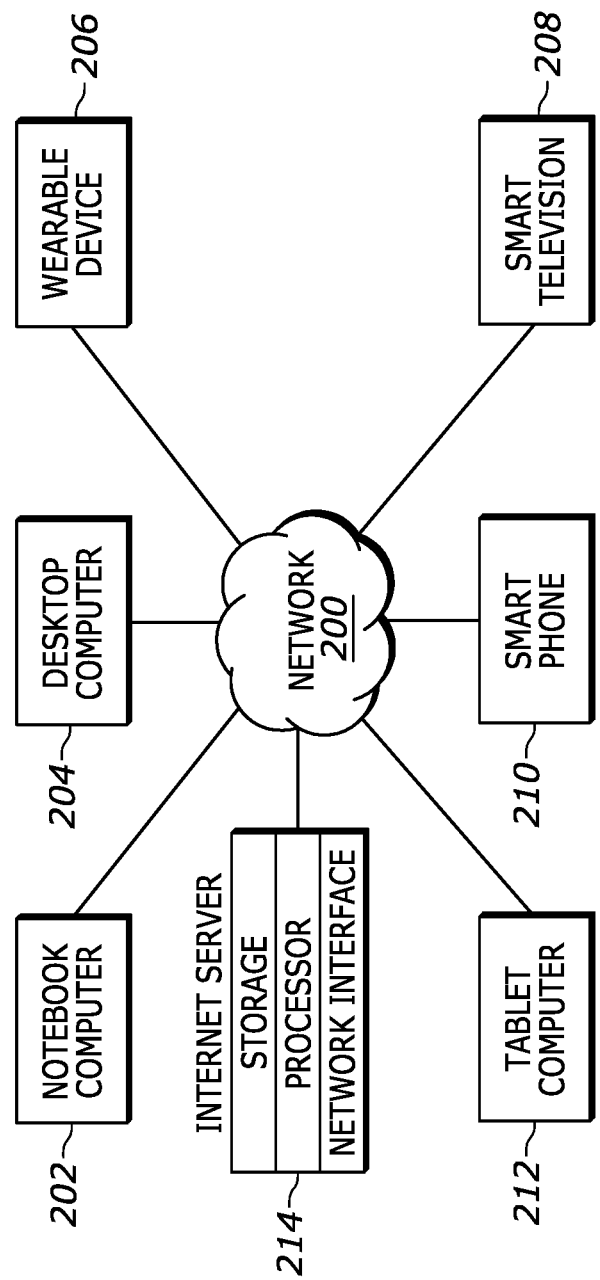
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
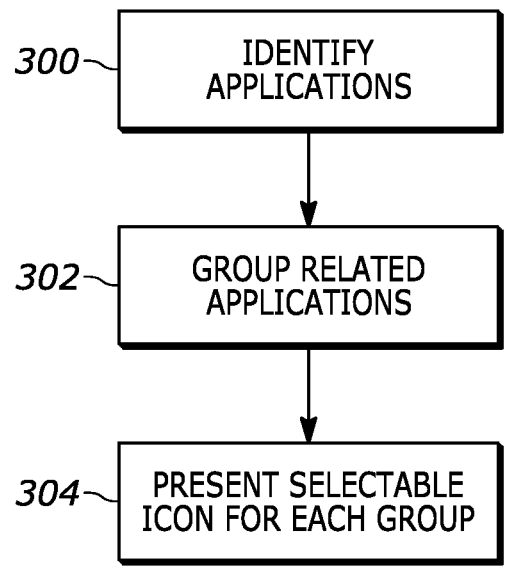
FIG. 3 is a flow chart of an example algorithm consistent with present principles.
Figure 7:
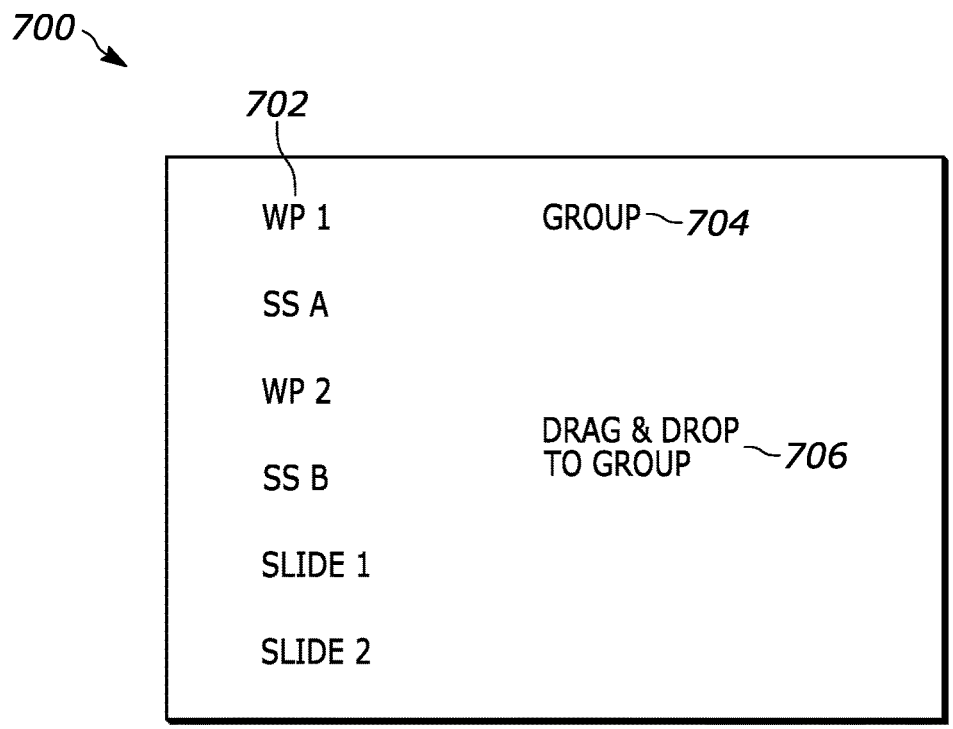
Figure 8:
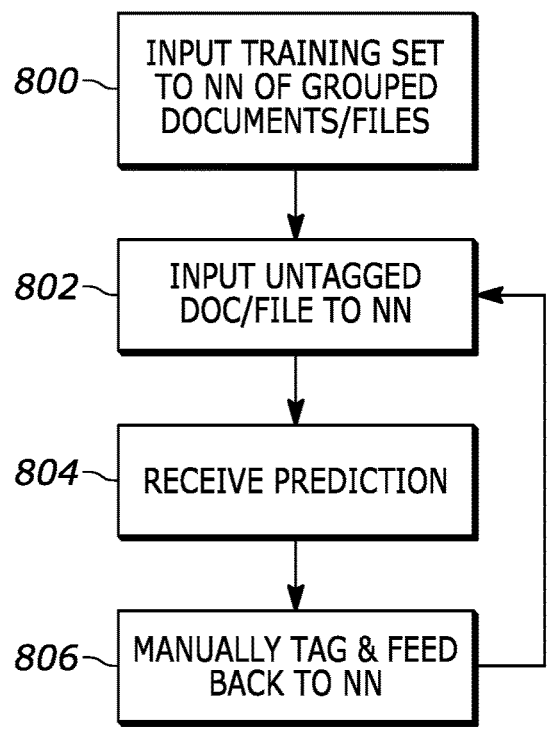
FIG. 8 is a flow chart of an example algorithm consistent with present principles.

Referring to FIG. 3, overall logic is shown that may be executed by a device such as any in the system 100 or network 200 in accordance with present principles. Beginning at block 300, plural applications are identified and at block 302 are grouped together typically because the plural applications are used in concert while executing a single task. For example, a user performing a particular task may require a word processing application to be open on one of plural monitors and a slide presentation to be open on another of the plural monitors. FIGS. 7 and 8, discussed further below, illustrate techniques for grouping applications at block 302. Then, at block 304 a selectable icon or other selector is presented on at least one of the plural monitors and can be selected with a single click to cause the grouped applications to be presented in the foregrounds of respective monitors. Additional icons for additional application groups can also be potentially presented for invocation of their respective applications all in a single desktop instantiation.

Note that for a single monitor embodiment, one application may be presented in a first window of the monitor and the second application presented in a second window of the monitor in response to selection of the selector.

Figure 4:
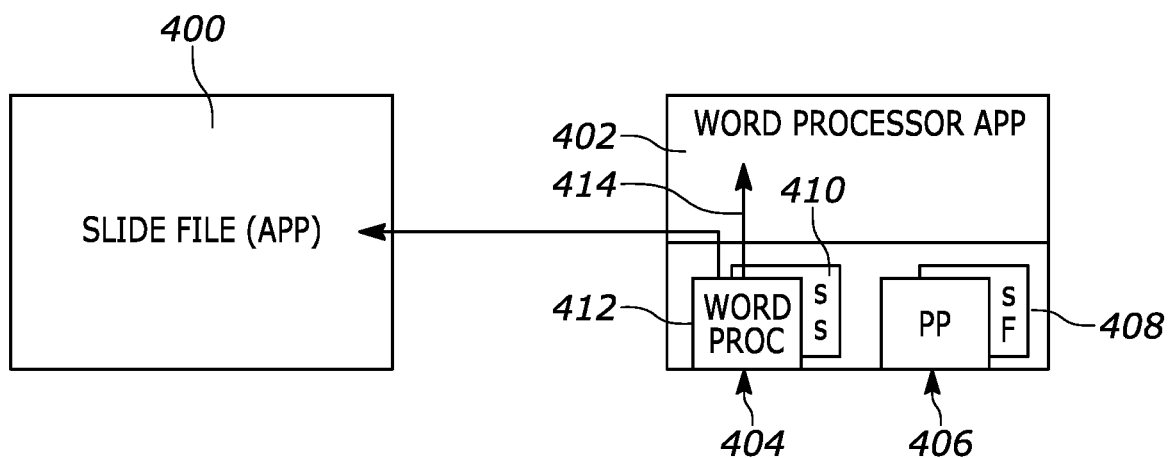
FIGS. 4-7 are an example user interfaces (UI) consistent with present principles.

FIG. 4 provides a first illustration using two video displays or monitors 400, 402, it being understood that present principles also apply to layouts having three or more monitors. As shown, a first selector 404 and a second selector 406 are presented, e.g., on a task bar 408 of at least one of the monitors (in this case, monitor 402). One selector may be presented on one monitor and the other selector presented on the opposite monitor if desired.

In the example shown, the selectors 404, 406 are configured as icons that in turn are configured as stacked overlapping boxes, with each box representing a respective application in the group represented by the selector. This is but one example configuration of a selector consistent with present principles. Each box may include text or coloring or other indicia indicating the type of application it represents, e.g., a word processing application, a slide show application, a portable document format (PDF) application, a spreadsheet application, etc.

A single click on the first selector 404 causes a first application (represented by one of the stacked boxes in the example shown) to be presented in the foreground of the first monitor 400 and a second application (represented by another one of the stacked boxes in the example shown) to be presented in the foreground of the second monitor 402. In the example shown, a slide application represented by a box 410 of the first example selector 404 is presented on the first monitor 400 while a word processing application represented by a box 412 of the first example selector 404 is presented on the second monitor 402. This action in response to selection of the selector is indicated by the arrows 414.

Similarly, selection of the second selector 406 causes respective applications identified as a group represented by the second selector 406 to be presented on the respective monitors 400, 402, by, e.g., moving the applications represented by the second selector 406 into the foregrounds of the monitors. In any case, it may now be appreciated that responsive to a single selection of a selector, the foregrounds of respective monitors or video displays are established or filled by respective applications represented by the selector. Moreover, it may be appreciated that responsive to selection of the second selector 406 with the first and second applications represented by the first selector 404 presented in foregrounds of the respective first and second monitors 400, 402, the first and second applications are replaced in the foregrounds of the first and second monitors 400, 402 by the applications represented by the second selector 406.

Figure 5:
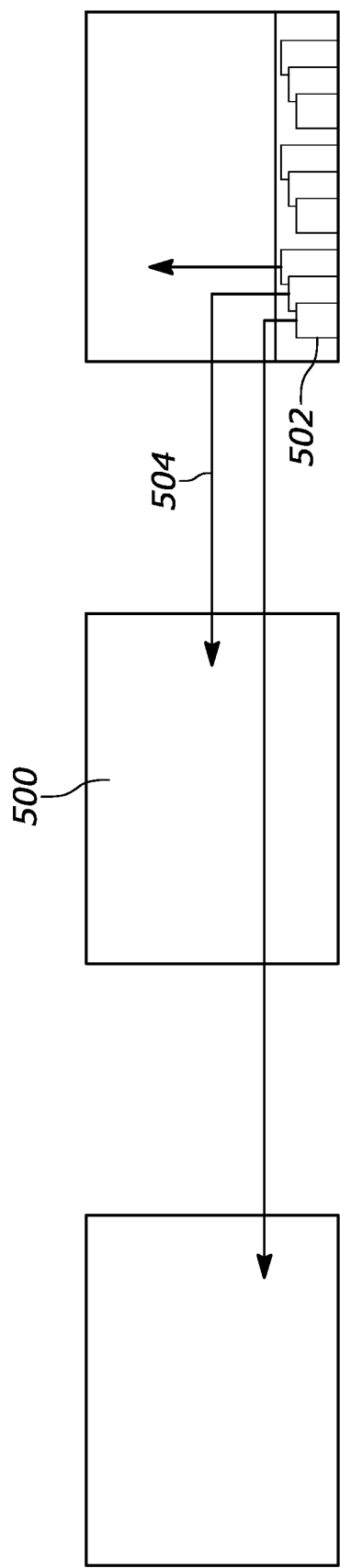

FIG. 5 illustrates that with three monitors 500, three respective applications may be brought to the foregrounds of the respective monitors by a single click of a selector 502 as indicated by the arrows 504, in the example shown configured as three overlapping stacked boxes each representing one of the applications in the group.

Figure 6:
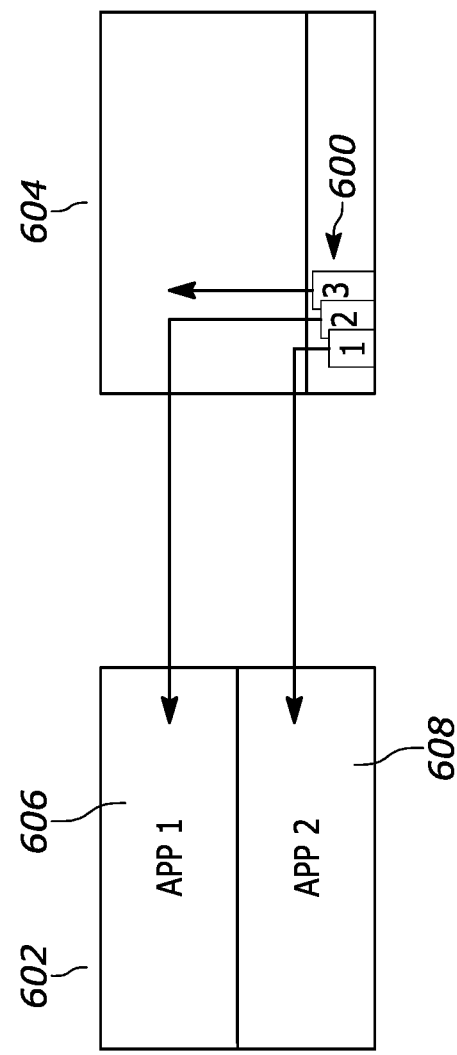

FIGS. 4 and 5 illustrate examples in which the number of applications invoked by selection of a selector is on a one-to-one basis with the number of video displays of the device. FIG. 6 illustrates another implementation in which the number of applications invoked by selection of a selector 600 (in the example shown, three applications) is greater than the number of video displays 602, 604 (in the example shown, two). In such an embodiment selection of the selector 600 can cause a first application to be presented in a first window 606 on the first video display 602, a second application to be presented in a second window 608 of the first video display 602, and a third application to be presented in substantially the entire canvas of the second video display 604. Other techniques for presenting N or more applications on N-1 displays may be used.

The applications of a group may be associated with a single selector responsive to input from a user input device associating the applications with the selector. Or, the applications may be associated with the selector using at least one neural network. FIGS. 7 and 8 illustrate.

In FIG. 7 a UI 700 is presented on, e.g., a touch screen display allowing a user to correlate, via the touch screen display or other user input device, applications from, e.g., an application list 702 with one or more application groups in a list 704. This may be done by dragging and dropping applications in the list 702 to a single group indicator in the group list 704, and instructions 706 may be presented to that effect. The entries in the application list 702 may be manually entered by a user, or may be presented automatically in a list from which the user can select applications (such as a list indicating all currently-launched applications that are currently being executed by the device). These are but two example techniques for associating applications into a single group.

FIG. 8 shows an alternate technique that uses one or more neural networks (NN) to learn what applications should be associated in a group. Commencing at block 800, a training set of applications in groups is input into the NN pre-classified by a trainer into the groupings. Moving to block 802, an untagged application is input to the NN and at block 804 a prediction is received from the NN as to what group the application belongs in. This prediction is manually tagged by a trainer at block 806 and fed back to the NN for further training. Note that the NN itself may be a recurrent and/or deep NN with an input layer, output layer, and multiple hidden layers therebetween.

Note that in some implementations the device controlling the monitors may also, based on user command, present a graphical user interface (GUI) on one or plural monitors for configuring settings of the device to operate consistent with present principles. For example, a GUI may be presented with a selector that is selectable to enable a setting for the device to undertake present principles, e.g., to undertake the logic of FIGS. 3 and 8 as well as to perform one or more of the functions described above in reference to FIGS. 4-7.

Also note that in some examples, not all associated applications may be currently launched and/or executing that are grouped together under a given selector/icon in a task bar at the time of selection of the selector to cause the grouped applications to be presented in the foreground as described herein. In these examples, the applications that are not yet launched and/or executing at the time of single-click icon/selector selection from the task bar may be launched and executed responsive to the single click/single selection and then associated windows may be presented at the appropriate location(s). In some examples, none of the applications associated with a particular group may be currently executing at the time of single-click icon/selector selection from the task bar, and thus the icon/selector may establish a quick launch group where all applications for the group are launched responsive to selection of the icon/selector so that respectively associated windows may then be presented.

What's more, in some examples a group of applications associated with a particular task and hence a particular task bar selector/icon might already have associated windows currently presented in the foreground on one or more video displays. When this is the case and the user selects the selector/icon associated with this task from the task bar, selection of the selector/icon may cause automatic minimization of all of the windows that are currently presented in the foreground and that are associated with applications grouped under the respective task. Minimizing itself may include removing the windows from presentation on any or all monitors/displays.

Further note that if a same application is grouped in different groupings for different respective tasks (e.g., graphic design as opposed to an administrative task), a window for that application may be brought to the foreground on one or more of the monitors at different sizes and locations that are configured by a user for each respective task. Thus, if a first task is selected via one task bar selector then a window for the associated application may be presented on a first monitor at a first location in a first size, and if a second different task is selected via a different task bar selector then a different window (or the same window) for that application may be presented on a second different monitor and/or at a separate different location and/or in a different second size.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   first and second video displays accessible to the at least one processor; and
   storage accessible to the at least one processor and comprising instructions executable by the at least one processor to:
   present on a task bar of at least one of the video displays at least a first selector selectable to cause a first application to be presented on the first video display and a second application to be presented on the second video display; and
   present on the task bar at least a second selector selectable to cause a third application to be presented on the first video display and a fourth application to be presented on the second video display;
   wherein a number of applications invoked by selection of the first selector is greater than a number of video displays of the device, and selection of the first selector causes the first application to be presented on the first video display, the second application to be presented in a first window on the second video display, and a fifth application to be presented in a second window of the second video display.

2. The device of claim 1, wherein the instructions are executable to:
   responsive to selection of the second selector with the first and second applications presented in foregrounds of the respective first and second video displays, replace the first and second applications with the third and fourth applications in the foregrounds of the first and second video displays.

3. The device of claim 1, wherein the first and second applications are associated with the first selector responsive to input from a user input device associating the first and second applications with the first selector, the input received at a touch-enabled one of the video displays.

4. The device of claim 3, wherein the touch-enabled one of the video displays presents a user interface (UI) at which the input is receivable, the UI comprising a list of applications that are associable with the first selector, each application from the list being selectable by the user to associate the respective application from the list with the first selector, each application from the list being selectable using a drag and drop action to drop the respective application over an indicator presented on the UI, the indicator being associated with the first selector, the indicator being separate on the UI from the applications in the list.

5. The device of claim 4, wherein the list indicates currently-launched applications that are currently being executed by the device.

6. The device of claim 1, wherein the instructions are executable to:
   responsive to selection of the first selector, launch the first, second, and fifth applications to present the first application on the first video display, the second application in the first window on the second video display, and the fifth application in the second window of the second video display.

7. The device of claim 6, wherein the first and second video displays are different from each other.

8. The device of claim 1, wherein the instructions are executable to:
   responsive to selection of the first selector while respective windows for the first, second, and fifth applications are already presented on the respective first or second video display, minimize the respective windows of the first, second, and fifth applications so that the respective windows are removed from presentation on the video displays.

9. The device of claim 1, wherein the instructions are executable to:
   present a user interface (UI) on one or more of the first and second video displays, the UI being different from the first and second windows, the UI being usable to configure one or more settings of the device, the UI comprising a third selector that is selectable to enable a setting for the device to present the first and second selectors on the task bar, the third selector being different from the first and second selectors.

10. A method comprising:
    associating a first selector with plural applications; and
    responsive to selection of the first selector, presenting the plural applications on respective plural monitors;
    wherein a number of applications invoked by selection of the first selector is on a one-to-one basis with a number of monitors such that a single click of the first selector causes plural applications to be presented on respective plural monitors.

11. The method of claim 10, wherein the plural applications are first plural applications, and wherein the method comprises:
    associating a second selector with second plural applications; and
    responsive to selection of the second selector, respectively presenting the second plural applications on respective plural monitors.

12. The method of claim 11, wherein the method comprises, after selection of the first selector followed by selection of the second selector, replacing the first plural applications associated with the first selector with the second plural applications associated with the second selector on the respective plural monitors.

13. The method of claim 10, comprising:
    associating the plural applications with the first selector responsive to input received at a user interface (UI) presented on one or more of the monitors, the UI comprising a list of applications that are associable with the first selector for a user to select one or more of the applications from the list to associate with the first selector.

14. The method of claim 10, comprising:

responsive to selection of the first selector: presenting a first application of the plural applications on a first monitor, presenting a second application of the plural applications on a second monitor, and presenting a third application of the plural applications on a third monitor, wherein the first, second, and third applications are different from each other and wherein the first, second, and third monitors are different from each other.

15. A computer readable storage medium (CRSM) that is not a transitory signal and that comprises instructions executable by at least one processor to:

identify that at least first and second applications are associated with a first selector; and responsive to a single selection of the first selector, establish in foregrounds of respective first and second video displays the respective first and second applications;

wherein a number of applications invoked by selection of the first selector is on a one-to-one basis with a number of video displays.

16. The CRSM of claim 15, wherein the first selector is selectable to cause a third application to be presented on a third video display, wherein the first, second, and third video displays are different from each other.

17. The CRSM of claim 15, wherein the instructions are executable to:

responsive to selection of a second selector with first and second applications associated with the first selector presented in foregrounds of the respective first and second video displays, replace the first and second applications with third and fourth applications in the foregrounds of the first and second video displays.

18. The CRSM of claim 15, wherein the first and second applications are applications of different application types.

19. The CRSM of claim 15, wherein the first application is a word processing application and wherein the second application is a slide presentation application.

20. The CRSM of claim 15, wherein each video display is filled with a respective first or second application.

* * * * *